US012463233B2

(12) United States Patent
Lee et al.

(10) Patent No.: US 12,463,233 B2
(45) Date of Patent: Nov. 4, 2025

(54) CUTTING DEVICE, AND LAMINATION APPARATUS AND LAMINATION METHOD FOR SECONDARY BATTERY COMPRISING THE SAME

(71) Applicant: LG Energy Solution, Ltd., Seoul (KR)

(72) Inventors: Seo Jun Lee, Daejeon (KR); Tae Su Kim, Daejeon (KR); Hyuk Soo Lee, Daejeon (KR); Jung Hyun Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 89 days.

(21) Appl. No.: 18/024,637

(22) PCT Filed: Jan. 11, 2022

(86) PCT No.: PCT/KR2022/000467
§ 371 (c)(1),
(2) Date: Mar. 3, 2023

(87) PCT Pub. No.: WO2022/149952
PCT Pub. Date: Jul. 14, 2022

(65) Prior Publication Data
US 2023/0318007 A1    Oct. 5, 2023

(30) Foreign Application Priority Data

Jan. 11, 2021 (KR) .................. 10-2021-0003616
Jan. 7, 2022 (KR) .................. 10-2022-0003013

(51) Int. Cl.
*B23K 26/38*    (2014.01)
*B23K 26/08*    (2014.01)
(Continued)

(52) U.S. Cl.
CPC ....... *H01M 10/0404* (2013.01); *B23K 26/083* (2013.01); *B23K 26/16* (2013.01);
(Continued)

(58) Field of Classification Search
CPC ............... B23K 26/38; B23K 26/0838; H01M 10/0585
See application file for complete search history.

(56) References Cited

U.S. PATENT DOCUMENTS

2011/0131799 A1    6/2011  Ito et al.
2011/0244287 A1   10/2011  Kim et al.
(Continued)

FOREIGN PATENT DOCUMENTS

EP    1447068 A1 *  8/2004  ....... A61F 13/15723
JP    H09-306481 A   11/1997
(Continued)

OTHER PUBLICATIONS

English translation of WO2008138370 (Year: 2008).*
(Continued)

*Primary Examiner* — Scott W Dodds
(74) *Attorney, Agent, or Firm* — Lerner David LLP (57) ABSTRACT

A lamination apparatus for a secondary battery comprises a lamination device and a cutting device. The supply unit supplies electrodes disposed on a separation sheet and a bonding unit which bonds the separation sheet and electrodes to manufacture a radical unit sheet. The cutting device cuts the separation sheet of the radical unit sheet to manufacture a radical unit constituted of a separator and the electrodes. The cutting device comprises a transfer conveyor, which transfers the radical unit sheet, a laser cutting unit, which irradiates a laser onto and thereby cuts the separation sheet of the radical unit sheet to manufacture the radical unit, a discharge conveyor, which transfers the radical unit cut by the laser cutting unit, and an adjusting unit which adjusts a speed for cutting the separation sheet passing through the laser cutting unit depending on a spaced distance between the transfer conveyor and the discharge conveyor.

4 Claims, 8 Drawing Sheets

(51) Int. Cl.
  *B23K 26/16* (2006.01)
  *H01M 4/139* (2010.01)
  *H01M 10/04* (2006.01)
  *B23K 101/36* (2006.01)

(52) U.S. Cl.
  CPC ............. *B23K 26/38* (2013.01); *H01M 4/139* (2013.01); *B23K 2101/36* (2018.08)

(56) References Cited

U.S. PATENT DOCUMENTS

| | | |
|---|---|---|
| 2014/0182118 A1 | 7/2014 | Kim et al. |
| 2014/0186671 A1 | 7/2014 | Kim et al. |
| 2014/0325833 A1 | 11/2014 | Ito et al. |
| 2019/0363389 A1* | 11/2019 | Ko .................... H01M 10/0463 |
| 2020/0203677 A1 | 6/2020 | Lee et al. |
| 2020/0235433 A1 | 7/2020 | Kim et al. |

FOREIGN PATENT DOCUMENTS

| | | | |
|---|---|---|---|
| JP | 2004-122336 A | 4/2004 | |
| JP | 2012-513076 A | 6/2012 | |
| JP | 2013178951 A | 9/2013 | |
| JP | 5408504 B2 | 2/2014 | |
| JP | 2015-188905 A | 11/2015 | |
| JP | 2018-195551 A | 12/2018 | |
| JP | 2019-021520 A | 2/2019 | |
| JP | 2020-027721 A | 2/2020 | |
| KR | 100958649 B1 | 5/2010 | |
| KR | 101420476 B1 | 7/2014 | |
| KR | 101726785 B1 | 4/2017 | |
| KR | 102126371 B1 | 6/2020 | |
| KR | 102167118 B1 | 10/2020 | |
| WO | WO-2008138370 A1 * | 11/2008 | ............ B23K 26/02 |
| WO | 2020192845 A1 | 10/2020 | |

OTHER PUBLICATIONS

International Search Report for PCT/KR2022/000467 mailed Apr. 14, 2022. 3 pgs.

Extended European Search Report including for Application No. 22736929.5 dated May 8, 2024, pp. 1-5.

* cited by examiner

| SPACED DISTANCE (α) | | 10mm | 20mm | 30mm | 50mm |
|---|---|---|---|---|---|
| PROCESS SPEED | MOVING SPEED | | LASER CUTTING UNIT SPEED | | |
| 80cpm | 135mm/s | 8.1m/s | 4.1m/s | 2.7m/s | 1.6m/s |
| 160cpm | 270mm/s | 16.2m/s | 8.1m/s | 5.4m/s | 3.2m/s |
| 220cpm | 371mm/s | 22.2m/s | 11.1m/s | 7.4m/s | 4.5m/s |
| 300cpm | 506mm/s | 30.3m/s | 15.2m/s | 10.1m/s | 6.1m/s |

FIG. 8

CUTTING DEVICE, AND LAMINATION APPARATUS AND LAMINATION METHOD FOR SECONDARY BATTERY COMPRISING THE SAME

CROSS-REFERENCE TO RELATED APPLICATIONS

The present application is a national phase entry under 35 U.S.C. § 371 of International Application No. PCT/KR2022/000467 filed on Jan. 11, 2022, which claims priority from Korean Patent Application Nos. 10-2021-0003616, filed on Jan. 11, 2021, and 10-2022-0003013, filed on Jan. 7, 2022, all of which are hereby incorporated by reference in their entireties.

FIELD

The present invention relates to a cutting device, and a lamination apparatus and a lamination method for a secondary battery comprising the same, and more particularly, to a cutting device, which may improve separator-cutting quality, and a lamination apparatus and a lamination method for a secondary battery comprising the cutting device.

BACKGROUND

In general, secondary batteries refer to batteries that are chargeable and dischargeable unlike non-rechargeable primary batteries, and such secondary batteries have been widely used in the fields of a high-tech electronic device such as a phone, a notebook computer and a camcorder.

The secondary batteries are classified into a can type secondary battery, in which an electrode assembly is embedded in a metal can, and a pouch type secondary battery in which an electrode assembly is embedded in a pouch. The pouch type secondary battery comprises an electrode assembly, an electrolyte, and a pouch in which the electrode assembly and the electrolyte are accommodated. In the electrode assembly, a positive electrode and a negative electrode are disposed with a separator therebetween. Electrode tabs are attached to the positive electrode and the negative electrode, respectively. An electrode lead is coupled to each of the electrode tabs.

A lamination process is performed on the secondary battery in order to improve adhesion of the electrode assembly in which the positive electrode, the separator, and the negative electrode are stacked.

That is, the lamination process comprises supplying electrodes and a separation sheet, disposing a plurality of electrodes in a length direction of the separation sheet, pressure bonding the electrodes and the separation sheet, cutting, by a molded knife, the separation sheet between the electrodes corresponding to each other to manufacture a radical unit provided with the electrodes and a separator, and stacking at least one radical unit to complete an electrode assembly.

However, since the cutting in a typical lamination process is performed in a state where the molded knife is in physical contact with the separator, there has been a problem that a defect, such as bending or pushing off of the separator, occurs.

SUMMARY OF THE DISCLOSURE

In order to solve the problem, the present invention is intended to provide: a cutting device, which cuts the separation sheet by applying a laser cutting unit without physical contact with the separation sheet so that the defect, such as bending or pushing off of the separator, may be prevented and particularly, cutting quality and cutting precision may increase; and a lamination apparatus and a lamination method for a secondary battery comprising the cutting device.

In order to achieve the purpose, the lamination apparatus for a secondary battery according to the present invention comprises: a lamination device provided with a supply unit, which supplies at least one separation sheet and electrodes disposed by a set gap on the at least one separation sheet, and a bonding unit, which bonds the separation sheet and the electrodes, passing through the supply unit, to manufacture a radical unit sheet; and a cuffing device which cuts the separation sheet of the radical unit sheet, passing through the lamination device, to manufacture a radical unit constituted by a separator and the electrodes. The cutting device may comprise a transfer conveyor, which transfers the radical unit sheet passing through the lamination device; a laser cutting unit, which irradiates laser onto the separation sheet of the radical unit sheet passing through the transfer conveyor so that the separation sheet is cut by irradiation from one end to the other end in a width direction of the separation sheet to manufacture the radical unit; a discharge conveyor, which is provided apart from the transfer conveyor and transfers the radical unit cut by the laser cutting unit; and an adjusting unit, which adjusts a speed for cutting the separation sheet through the laser cutting unit depending on a spaced distance between the transfer conveyor and the discharge conveyor.

When the spaced distance between the transfer conveyor and the discharge conveyor increases, the adjusting unit may adjust the speed for cutting the separation sheet through the laser cutting unit to decrease, and when the spaced distance between the transfer conveyor and the discharge conveyor decreases, the adjusting unit may adjust the speed for cutting the separation sheet through the laser cutting unit to increase.

The adjusting unit may further adjust the speed for cutting the separation sheet through the laser cutting unit depending on a moving speed of the transfer conveyor. When the moving speed of the transfer conveyor increases, the adjusting unit may adjust the speed for cutting the separation sheet through the laser cutting unit to increase together, and when the moving speed of the transfer conveyor decreases, the adjusting unit may adjust the speed for cutting the separation sheet through the laser cutting unit to decrease together.

The adjusting unit may further adjust the speed for cutting the separation sheet through the laser cutting unit depending on a process speed of the lamination device to manufacture the radical unit sheet. When the process speed of the lamination device increases, the adjusting unit may adjust the speed for cutting the separation sheet through the laser cutting unit to increase together, and when the process speed of the lamination device decreases, the adjusting unit may adjust the speed for cutting the separation sheet through the laser cutting unit to decrease together.

The discharge conveyor may have a set speed faster than that of the transfer conveyor.

The cutting device may further comprise a suction unit, which suctions and removes a foreign matter or dust occurring when the laser cutting unit cuts the separation sheet. The suction unit may comprise: a lower suction, which is provided between the transfer conveyor and the discharge conveyor, and suctions and removes a foreign matter and/or dust occurring below the separation sheet when the separation sheet is cut; and an upper suction, which is provided above the discharge conveyor, and suctions and removes a foreign matter or dust present on a surface of the radical unit transferred by the discharge conveyor.

A lamination method for a secondary battery according to the present invention comprises: a lamination operation comprising a supply process of supplying at least one separation sheet and supplying electrodes to be disposed by a set gap on the at least one separation sheet, and a bonding process of bonding the separation sheet and the electrodes after the supply process, to manufacture a radical unit sheet; and a cutting operation of cutting the separation sheet of the radical unit sheet after the lamination operation, to manufacture a radical unit constituted by a separator and the electrodes. The cutting operation may comprise a transfer process of transferring, by a transfer conveyor, the radical unit sheet after the lamination operation; a laser cutting process of irradiating, by a laser cutting unit, laser onto the separation sheet of the radical unit sheet so that the separation sheet is cut by irradiation from one end to the other end in a width direction of the separation sheet to manufacture the radical unit; and a discharge process of transferring, by a discharge conveyor, the radical unit cut by the laser cutting unit. The cutting operation may further comprise an adjusting process of adjusting, by an adjusting unit, a speed for cutting the separation sheet through the laser cutting unit depending on a spaced distance between the transfer conveyor and the discharge conveyor.

In the adjusting process, when the spaced distance between the transfer conveyor and the discharge conveyor increases, the speed for cutting the separation sheet through the laser cutting unit may be adjusted by the adjusting unit to decrease, and when the spaced distance between the transfer conveyor and the discharge conveyor decreases, the speed for cutting the separation sheet through the laser cutting unit may be adjusted by the adjusting unit to increase.

In the adjusting process, the speed for cutting the separation sheet through the laser cutting unit may be further adjusted depending on a moving speed of the transfer conveyor. In the adjusting process, when the speed of the transfer conveyor increases, the speed for cutting the separation sheet through the laser cutting unit may be adjusted by the adjusting unit to increase together, and when the moving speed of the transfer conveyor decreases, the speed for cutting the separation sheet through the laser cutting unit may be adjusted by the adjusting unit to decrease together.

In the adjusting process, the speed for cutting the separation sheet through the laser cutting unit may be further adjusted depending on a process speed of the lamination operation to manufacture the radical unit sheet. In the adjusting process, when the process speed of the lamination operation increases, the speed for cutting the separation sheet through the laser cutting unit may be adjusted by the adjusting unit to increase together, and when the process speed of the lamination operation decreases, the speed for cutting the separation sheet through the laser cutting unit may be adjusted by the adjusting unit to decrease together.

In the adjusting process, the discharge conveyor may be adjusted to move at a set speed faster than that of the transfer conveyor.

The lamination method may further comprise, after the cutting operation, a suction operation of suctioning and removing a foreign matter or dust occurring when the separation sheet is cut.

The suction operation may comprise a lower suction process of suctioning and removing, by a lower suction, a foreign matter and/or dust occurring below the separation sheet when the laser cutting unit cuts the separation sheet, and an upper suction process of suctioning and removing, by an upper suction, a foreign matter or dust present on a top surface of the radical unit transferred through the discharge conveyor.

A cutting device for a secondary battery according to the present invention, which is used to cut a radical unit sheet comprising at least one separation sheet and electrodes disposed by a set gap on the at least one separation sheet, may comprise: a transfer conveyor, which transfers the radical unit sheet; a laser cutting unit, which irradiates laser onto the separation sheet of the radical unit sheet passing through the transfer conveyor so that the separation sheet is cut by irradiation from one end to the other end in a width direction of the separation sheet to manufacture a radical unit; a discharge conveyor, which is disposed apart from the transfer conveyor and transfers the radical unit cut by the laser cutting unit; and an adjusting unit, which adjusts a speed for cutting the separation sheet through the laser cutting unit depending on a spaced distance between the transfer conveyor and the discharge conveyor.

When the spaced distance between the transfer conveyor and the discharge conveyor increases, the adjusting unit may adjust the speed for cutting the separation sheet through the laser cutting unit to decrease, and when the spaced distance between the transfer conveyor and the discharge conveyor decreases, the adjusting unit may adjust the speed for cutting the separation sheet through the laser cutting unit to increase.

The lamination apparatus for a secondary battery according to the present invention comprises the lamination device and the cutting device and is characterized in that the cutting device comprises the transfer conveyor, the laser cutting unit, the discharge conveyor, and the adjusting unit. Due to the characteristics, the occurrence of defect, such as bending or pushing off of the separator, may be prevented. In particular, the speed for cutting the separation sheet through the laser cutting unit may be adjusted depending on the spaced distance between the transfer conveyor and the discharge conveyor. As a result, cutting precision and cutting quality for the separation sheet may increase.

DETAILED DESCRIPTION

Hereinafter, embodiments of the present invention will be described in detail with reference to the accompanying drawings to enable those skilled in the art to which the present invention pertains to easily carry out the present invention. The present invention may, however, be embodied in different forms and should not be construed as limited by the embodiments set forth herein. The parts unrelated to the description will be ruled out in order to clearly describe the present invention with reference to the drawings. Like reference numerals refer to like elements throughout the whole specification.

[Lamination Apparatus for Secondary Battery According to First Embodiment of Present Invention]

As illustrated in FIGS. 1 to 5, a lamination apparatus for a secondary battery according to a first embodiment of the present invention comprises a lamination device 100, which manufactures a radical unit sheet 10, and a cutting device 200, which cuts the radical unit sheet 10 manufactured by the lamination device 100 to manufacture a radical unit 20.

Lamination Device

Figure 1:
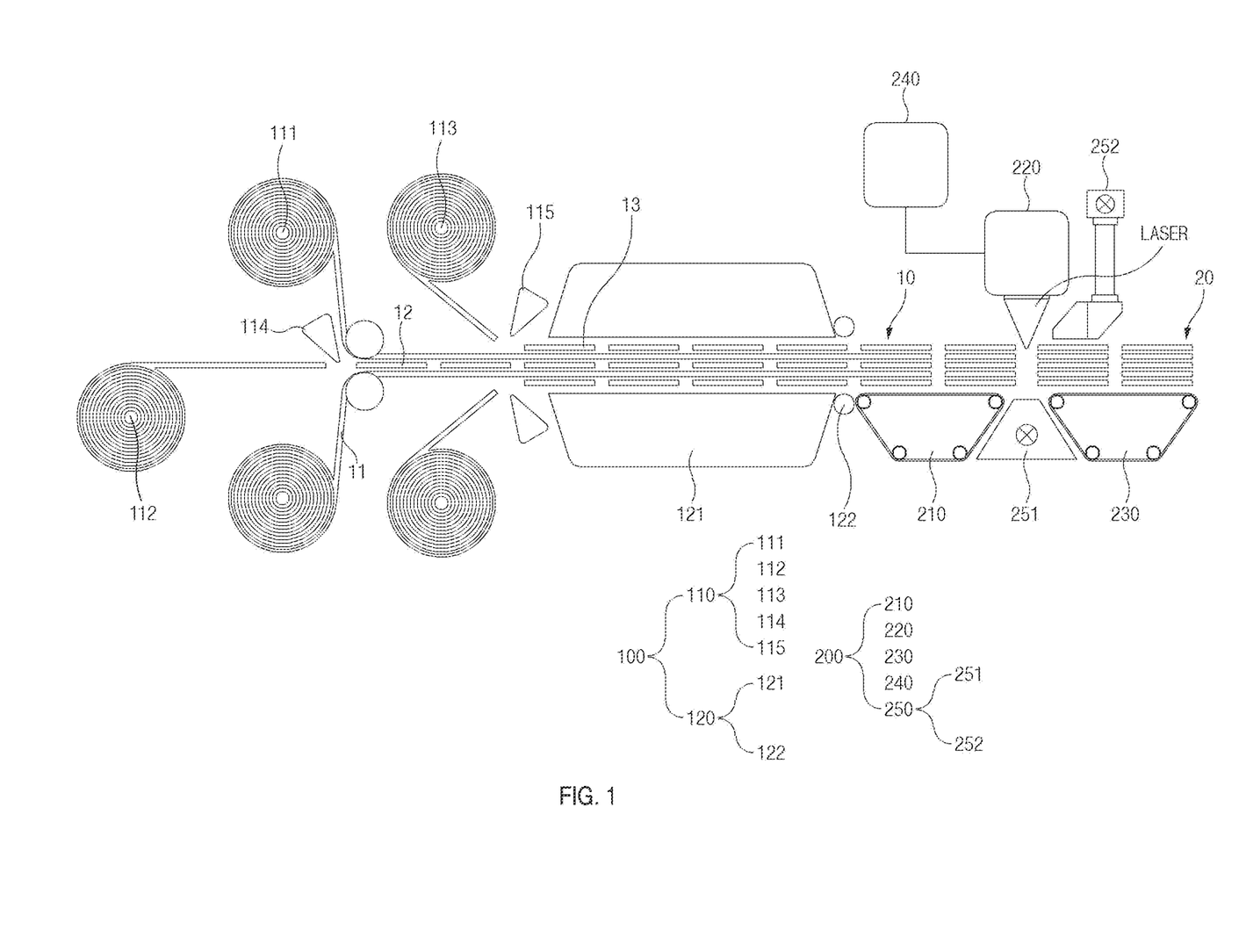
FIG. 1 is a side view schematically illustrating a lamination apparatus for a secondary battery according to a first embodiment of the present invention.

The lamination device 100 comprises a supply unit 110, which supplies at least one separation sheet and electrodes disposed apart by a set gap on the at least one separation sheet, and a bonding unit 120, which bonds the separation sheet and the electrodes, passing through the supply unit 110, to manufacture the radical unit sheet 10.

The supply unit 110 comprises a separation sheet supply roller 111, which supplies the at least one separation sheet 11, and an electrode supply roller, which supplies the electrodes to be disposed in sequence along an overall length direction of the separation sheet 11.

The electrodes comprise first electrodes 12 and second electrodes 13. The electrode supply roller comprises a first electrode supply roller 112, which supplies the first electrodes 12 to be disposed on one side of the separation sheet 11, and a second electrode supply roller 113, which supplies the second electrodes 13 to be disposed on the other side of the separation sheet 11. The first electrodes 12 may be positive electrodes and the second electrodes 13 may be negative electrodes, or vice versa.

The first electrode supply roller 112 cuts a long sheet-type first electrode sheet through a first cutter 114 to manufacture the first electrodes 12, and then disposes the first electrodes 12 on the one side of the separation sheet 11. The second electrode supply roller 113 cuts a long sheet-type second electrode sheet through a second cutter 115 to manufacture the second electrodes 13, and then disposes the second electrodes 13 on the other surface of the separation sheet 11.

For example, as illustrated in FIG. 1, the supply unit 110 supplies a pair of separation sheets 11 through the separation sheet supply roller 111, consecutively supplies the first electrodes 12 through the first electrode supply roller 112 to be disposed between the pair of separation sheets 11, and consecutively supplies the second electrodes 13 through the second electrode supply roller 113 to be disposed respectively on outer surfaces of the pair of separation sheets 11. Accordingly, a laminate, in which the second electrode 13, the separation sheet 11, the first electrode 12, the separation sheet 11 and the second electrode 13 are disposed in an upward-downward direction, may be manufactured.

The bonding unit 120 plays a role in bonding the separation sheet and the electrodes, passing through the supply unit 110, to manufacture the radical unit sheet 10. That is, the bonding unit 120 comprises a laminator 121, which heats the separation sheet and the electrodes, and a pressing roller 122, which pressure bonds the separation sheet and the electrodes.

In one example, the bonding unit 120 heats with the laminator 121 the laminate, which comprises the second electrode 13, the separation sheet 11, the first electrode 12, the separation sheet 11 and the second electrode 13, passing through the supply unit 110, and then pressure bonds the laminate with the pressing roller 122. Accordingly, the radical unit sheet 10 having a five-layer structure, which comprises the second electrode 13, the separation sheet 11, the first electrode 12, the separation sheet 11 and the second electrode 13, may be manufactured.

Cutting Device

Figure 2:
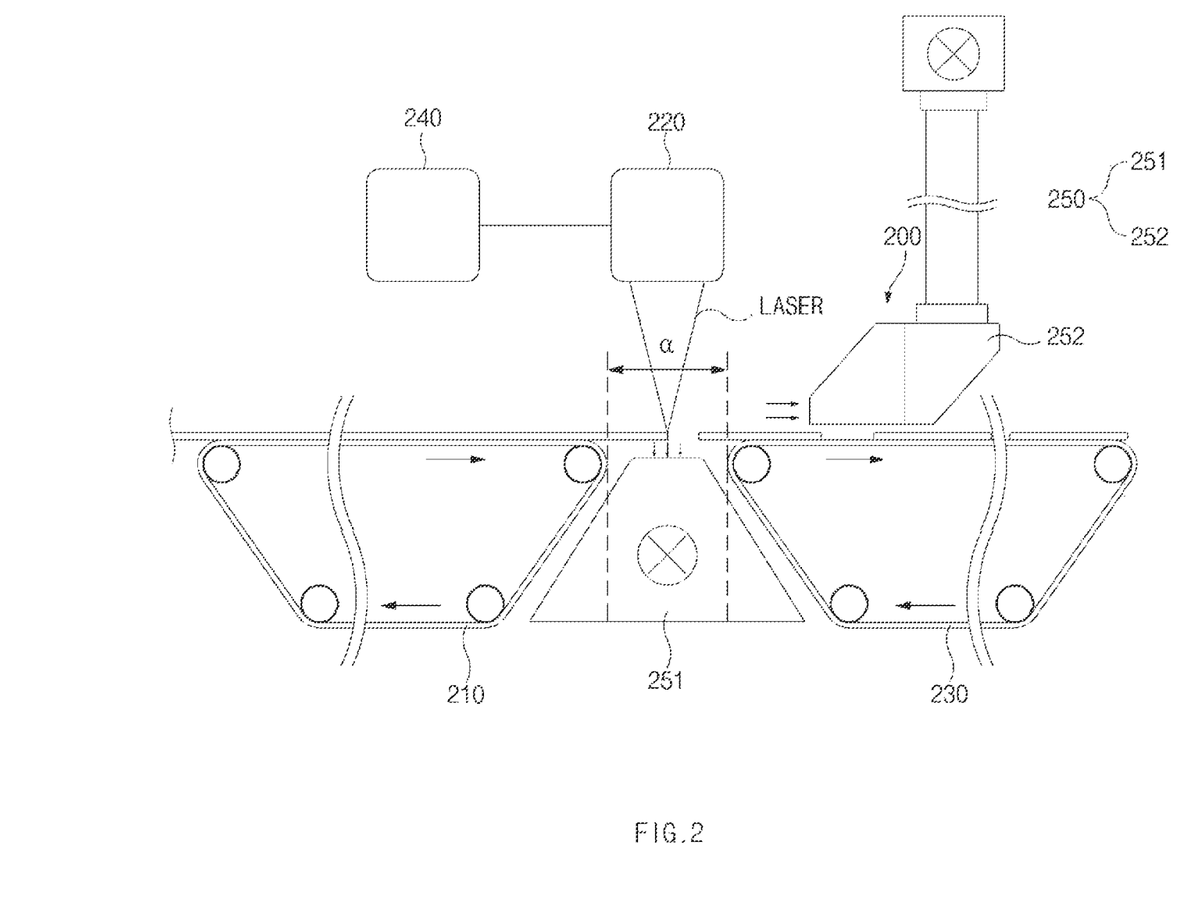
FIG. 2 is a side view illustrating a cutting device of the lamination apparatus for a secondary battery according to the first embodiment of the present invention.
Figure 5:
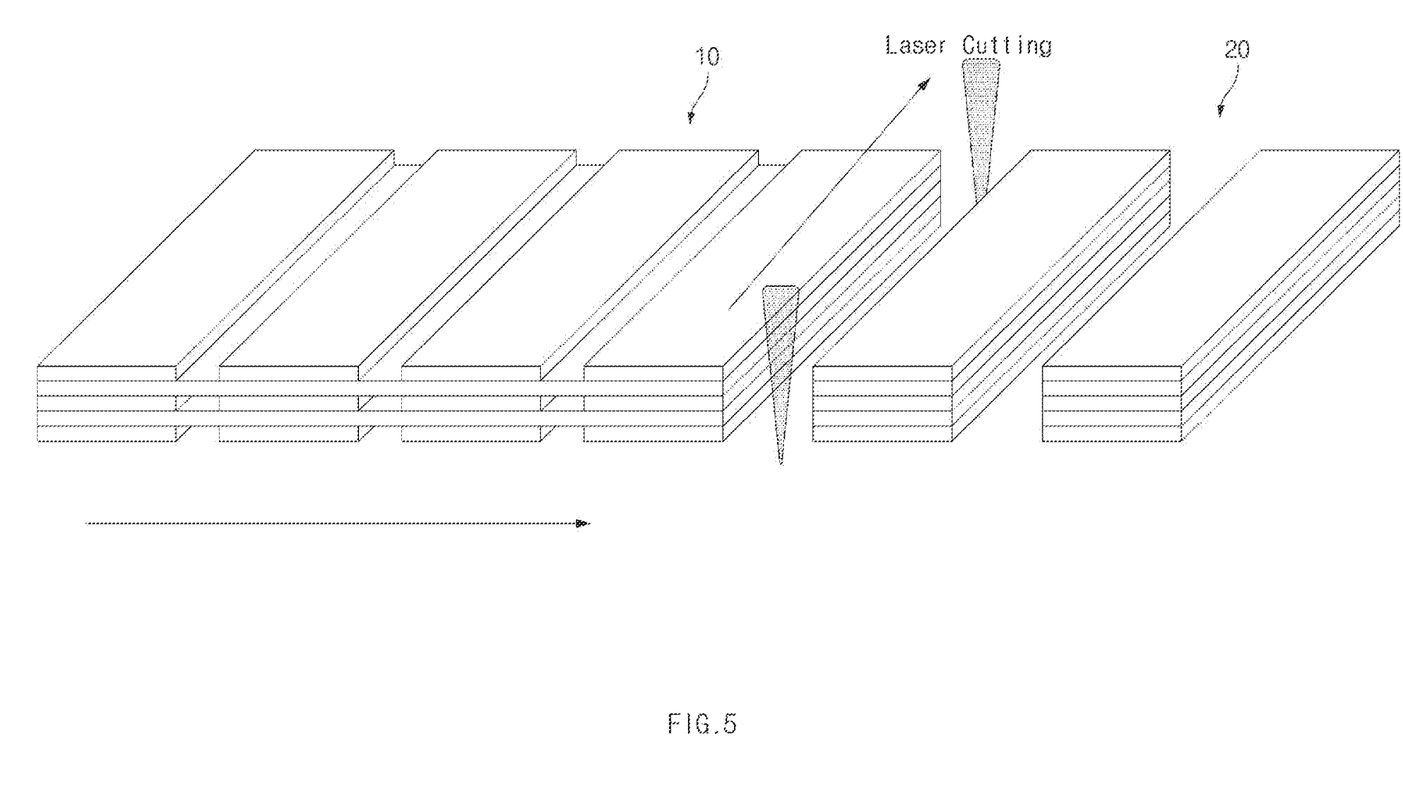
FIG. 5 is a perspective view illustrating a cutting state of the laser cutting unit of FIG. 3.

The cutting device 200 plays a role in cutting the radical unit sheet 10 to manufacture the radical unit 20. That is, the cutting device 200 comprises a transfer conveyor 210, which transfers the radical unit sheet 10 passing through the lamination device 100, a laser cutting unit 220, which irradiates laser onto the separation sheet 11 of the radical unit sheet 10 passing through the transfer conveyor 210, and cuts the separation sheet 11 by irradiation from one end to the other end in an overall width direction of the separation sheet 11 (in an upward-downward direction perpendicular to a moving direction of the separation sheet as seen in FIG. 5), to manufacture the radical unit 20, and a discharge conveyor 230 which is provided apart from the transfer conveyor 210 and transfers the radical unit 20 cut by the laser cutting unit 220.

That is, when the separation sheet 11 of the radical unit sheet 10, transferred through the transfer conveyor 210, passes between the transfer conveyor 210 and the discharge conveyor 230, the cutting device 200 cuts the separation sheet 11 in the overall width direction through the laser irradiated from the laser cutting unit 220 to manufacture the radical unit 20. Accordingly, the laser cutting unit 220 cuts the separation sheet 11 between an electrode and an electrode, which correspond to each other, to manufacture the radical unit 20 constituted by a separator and the electrodes. Thereafter, the radical unit 20 cut by the laser cutting unit 220 is transferred to a set place through the discharge conveyor 230.

Figure 3:
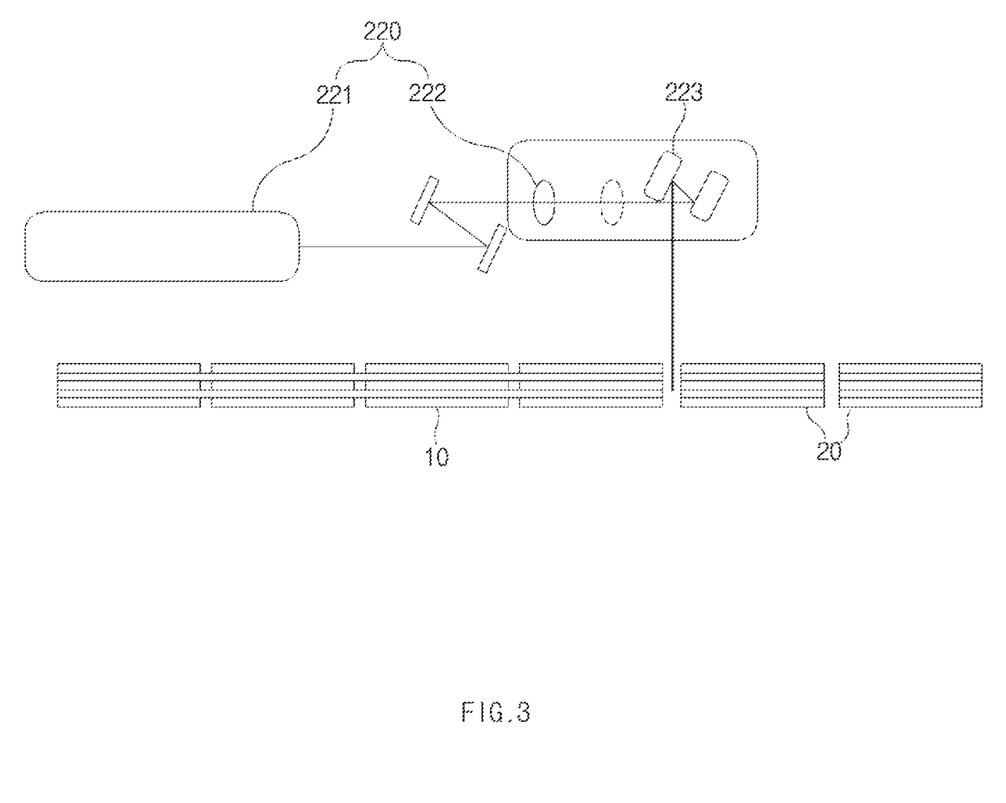
FIG. 3 is a side view illustrating a laser cutting unit provided in the cutting device of FIG. 2.

The laser cutting unit 220 comprises a laser generator 221, which generates a laser beam, a lens 222, which adjusts a focus of the laser beam generated from the laser generator 221, a first reflector and a second reflector 223, which reflect the laser beam passing through the lens 222 to be irradiated onto the separation sheet 11 of the radical unit sheet 10, and a F-theta lens 224, which minimizes a distortion of a central part and an outer part of the laser beam irradiated onto the separation sheet of the radical unit sheet so that the central part and the outer part of the laser beam irradiated onto the separation sheet are focused at the same position.

Figure 4:
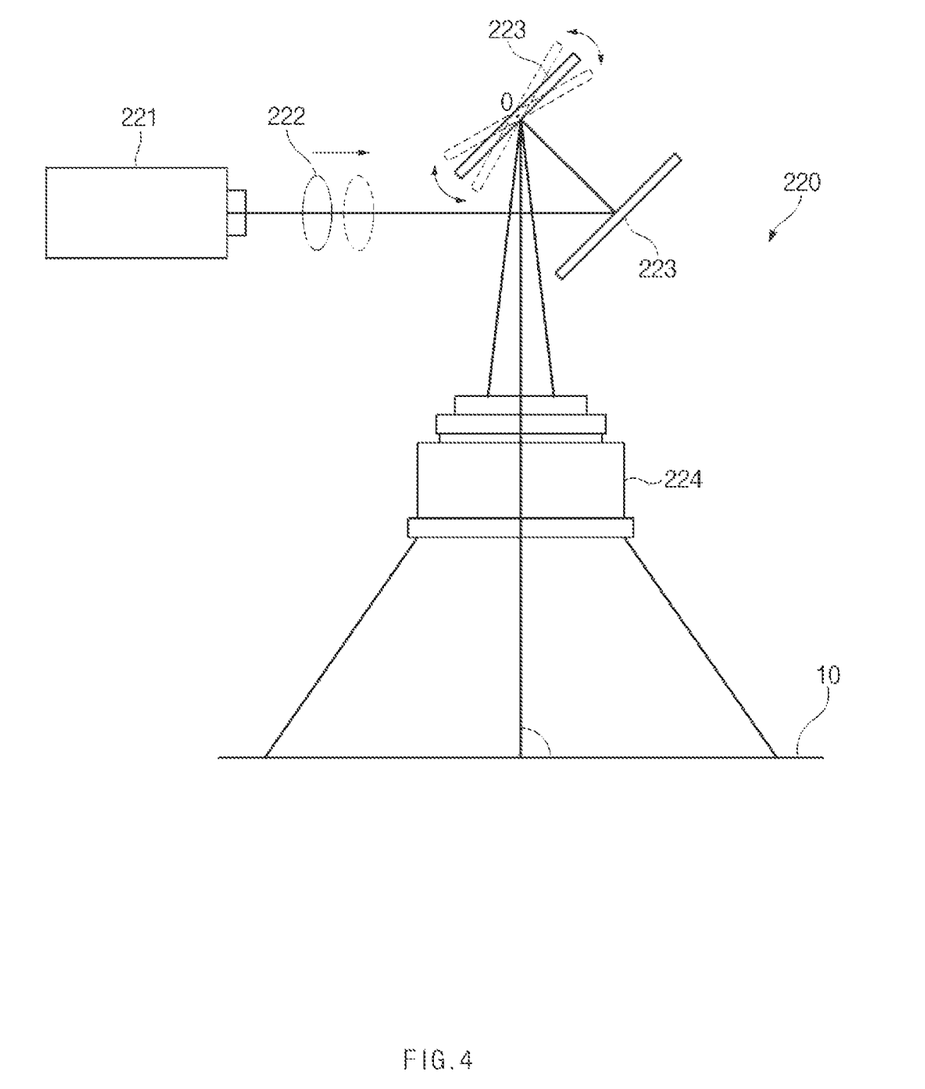
FIG. 4 is a side view illustrating a 3D scanner of the laser cutting unit of FIG. 3.

In more detail, in the laser cutting unit 220 as illustrated in FIG. 3, when a laser beam is generated by the laser generator 221, a focus is adjusted while the laser beam generated from the laser generator 221 passes through the lens 222, and the laser beam is irradiated onto the separation sheet of the radical unit sheet while reflected by the first reflector and the second reflector 223. When a tilt angle of the second reflector 223 is adjusted in the width direction of the separation sheet 11 as illustrated in FIG. 4, the laser beam reflected by the second reflector 223 cuts the separation sheet 11 while moving from one end to the other end in the width direction of the separation sheet 11 as illustrated in FIG. 5. When the speed for adjusting the tilt angle of the second reflector 223 increases, a speed for cutting the separation sheet 11 may increase. When the speed for adjusting the tilt angle of the second reflector 223 decreases, the speed for cutting the separation sheet 11 may decrease. That is, the speed for cutting the separation sheet 11 may be adjusted through the second reflector 223.

The laser cutting unit comprises a gun type and a scanner type. Preferably, referring to FIG. 4, the scanner type capable of effectively adapting the cutting speed is used as a laser cutting unit. In one example, a 3D scanner is used as a laser cutting unit for correspondence between a separator-cutting speed and a cut width.

The cutting device 200 having such a configuration comprises the laser cutting unit 220 so that the separation sheet may be effectively cut through a non-contact type laser and accordingly, the occurrence of defect, such as bending or pushing off of the separator, may be prevented.

The lamination apparatus for a secondary battery according to the first embodiment of the present invention further comprises a suction unit 250 for suctioning a foreign matter and dust occurring when the separation sheet is cut. The suction unit 250 is disposed between the transfer conveyor 210 and the discharge conveyor 230. The transfer conveyor 210 and the discharge conveyor 230 have a spaced distance a to dispose the suction unit 250.

When the spaced distance a between the transfer conveyor 210 and the discharge conveyor 230 excessively increases, a defect may occur as a cutoff surface of the separation sheet 11 bends toward a space between the transfer conveyor 210 and the discharge conveyor 230 when the separation sheet is cut.

The spaced distance a refers to a straight distance between an end of the transfer conveyor 210 and an end of the discharge conveyor 230, which correspond to each other.

In order to solve the problem, when the spaced distance a between the transfer conveyor 210 and the discharge conveyor 230 increases, the lamination apparatus for a secondary battery according to the first embodiment of the present invention increases the time for completely cutting the separation sheet by reducing the cutting speed of the laser cutting unit so that the cutoff surface of the separation sheet may be guided to be stably seated on the discharge conveyor 230 without bending toward the space between the transfer conveyor 210 and the discharge conveyor 230.

In one example, the cutting device 200 may comprise an adjusting unit 240, which adjusts the speed for cutting the separation sheet 11 through the laser cutting unit 220 depending on the spaced distance between the transfer conveyor 210 and the discharge conveyor 230.

Figure 8:
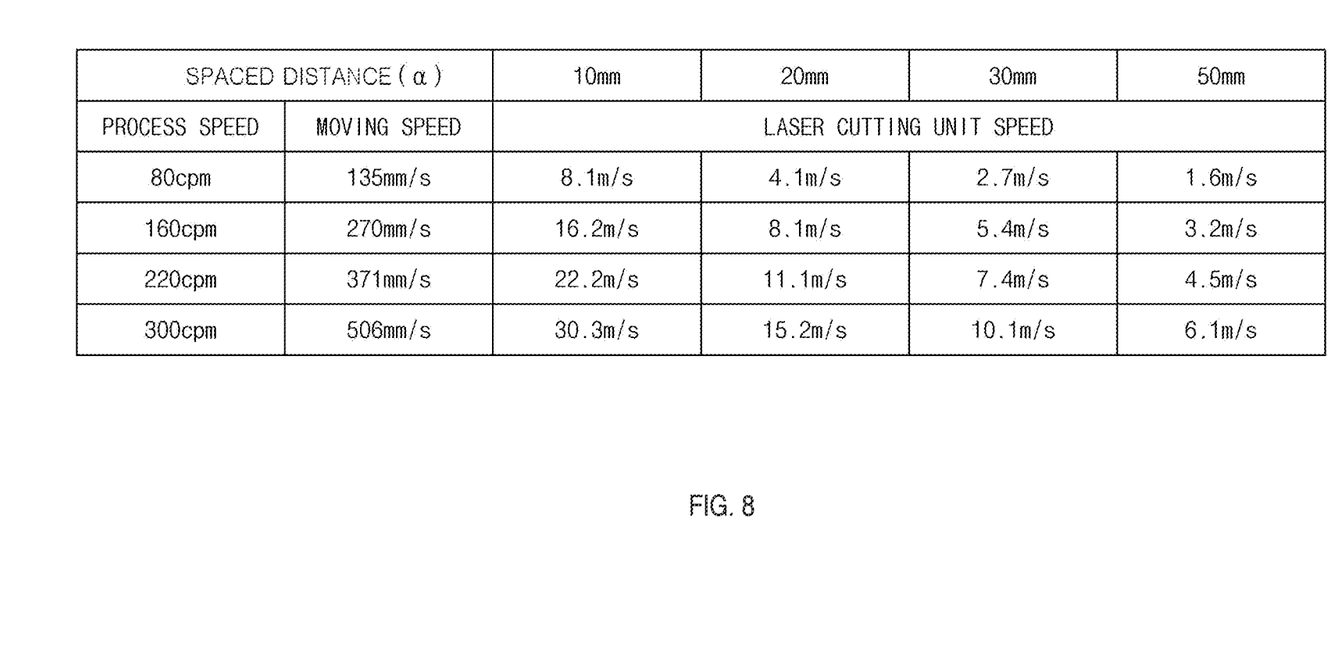
FIG. 8 is a table indicating experimental results of the present invention.

That is, referring to a table in FIG. 8, when the spaced distance between the transfer conveyor 210 and the discharge conveyor 230 increases, the adjusting unit 240 adjusts the speed for cutting the separation sheet 11 through the laser cutting unit 220 to decrease, and when the spaced distance between the transfer conveyor 210 and the discharge conveyor 230 decreases, the adjusting unit 240 adjusts the speed for cutting the separation sheet 11 through the laser cutting unit 220 to increase.

Accordingly, the adjusting unit 240 may adjust the time for completely cutting the separation sheet 11 by adjusting the cutting speed of the laser cutting unit 220. Accordingly, the cutoff surface of the separation sheet 11 may be prevented from bending between the transfer conveyor 210 and the discharge conveyor 230.

FIG. 8 is a table indicating a cutting speed of the laser cutting unit.

In FIG. 8, a process speed is a speed at which the radical unit sheet is manufactured by the lamination device, a moving speed is a speed of the radical unit sheet transferred by the transfer conveyor 210, and a laser cutting unit speed is a speed for cutting a separation sheet through the laser cutting unit.

In a first experimental example, referring to the table in FIG. 8, when the process speed is about 80 cpm and the moving speed is about 135 mm/s, and when the spaced distance between the transfer conveyor 210 and the discharge conveyor 230 is about 10 mm, the laser cutting unit cuts the separation sheet 11 at a speed of about 8.1 m/s. In addition, when only the spaced distance between the transfer conveyor 210 and the discharge conveyor 230 increases to about 50 mm, the laser cutting unit cuts the separation sheet at a speed of about 1.6 m/s. That is, it may be known that as the spaced distance between the transfer conveyor 210 and the discharge conveyor 230 gradually increases, the cutting speed of the laser cutting unit gradually decreases. This is to delay the speed for cutting the separation sheet so that the cutoff surface of the separation sheet is prevented from bending between the transfer conveyor 210 and the discharge conveyor 230.

The adjusting unit 240 may adjust the cutting speed of the laser cutting unit 220 depending on the moving speed of the radical unit sheet 10 through the transfer conveyor 210.

That is, when the moving speed of the transfer conveyor 21 increases, the adjusting unit 240 adjusts the speed for cutting the separation sheet 11 through the laser cutting unit 220 to increase together, and when the moving speed of the transfer conveyor 21 decreases, the adjusting unit 240 adjusts the speed for cutting the separation sheet 11 through the laser cutting unit 220 to decrease together.

In a second experimental example, referring to the table in FIG. 8, when the process speed is about 80 cpm and the spaced distance between the transfer conveyor 210 and the discharge conveyor 230 is about 10 mm, and when the moving speed is about 135 mm/s, the laser cutting unit 220 cuts the separation sheet 11 at a speed of about 8.1 m/s. In addition, when only the moving speed increases to about 506 mm/s, the laser cutting unit 220 cuts the separation sheet at a speed of about 30.3 m/s. That is, it may be known that when the moving speed increases, the cutting speed of the laser cutting unit 220 increases together.

Here, when the spaced distance between the transfer conveyor 210 and the discharge conveyor 230 increases to about 50 mm, the adjusting unit 240 may adjust the cutting speed of the laser cutting unit 220 to decrease to about 6.1 m/s.

The adjusting unit 240 may adjust the speed for cutting the separation sheet through the laser cutting unit depending on the process speed of the lamination device to manufacture the radical unit sheet 10.

That is, when the process speed of the lamination device 100 increases, the adjusting unit 240 adjusts the speed for cutting the separation sheet through the laser cutting unit 220 to increase together, and when the process speed of the lamination device 100 decreases, the adjusting unit 240 adjusts the cutting speed of the laser cutting unit to decrease together.

In a third experimental example, referring to the table in FIG. 8, when the process speed is about 80 cpm, the moving speed is about 135 mm/s, and the spaced distance between the transfer conveyor 210 and the discharge conveyor 230 is about 10 mm, the laser cutting unit 220 cuts the separation sheet 11 at a speed of about 8.1 m/s. In addition, when only the process speed increases to about 300 cpm, the laser cutting unit 220 cuts the separation sheet 11 at a speed of about 30.3 m/s. That is, it may be known that when the process speed increases, the cutting speed of the laser cutting unit 220 increases together.

The discharge conveyor 230 has a faster transfer speed than the transfer conveyor 210. In one example, the discharge conveyor 230 has a faster moving speed by about 3-7 mm/s, preferably about 5 mm/s, than the transfer conveyor 210. Accordingly, compared to the radical unit sheet transferred by the transfer conveyor 210, the radical unit cut by the laser cutting unit may be rapidly transferred through the discharge conveyor 230, without being retarded.

Thus, the lamination apparatus for a secondary battery according to the first embodiment of the present invention may more precisely cut the separation sheet by adjusting the cutting speed of the laser cutting unit depending on the spaced distance between the transfer conveyor 210 and the discharge conveyor 230, the moving speed of the radical unit sheet, or the process speed of the lamination device.

The suction unit 250 comprises a lower suction 251, which is provided between the transfer conveyor 210 and the discharge conveyor 230, and suctions and removes a foreign matter and/or dust occurring below the separation sheet 11 when the laser cutting unit 220 cuts the separation sheet 11, and an upper suction 252, which is provided above the discharge conveyor 230, and suctions and removes a foreign matter or dust present on a top surface of the radical unit 20 transferred by the discharge conveyor 230.

Accordingly, the suction unit 250 may effectively suction and remove a foreign matter or dust occurring below and above the separation sheet 11 when the separation sheet 11 is cut.

Hereinafter, a lamination method using the lamination apparatus for a secondary battery according to the first embodiment of the present invention will be described.

[Lamination Method for Secondary Battery According to First Embodiment of Present Invention]

As illustrated in FIGS. 1, 3, 4 and 6, a lamination method for a secondary battery according to the first embodiment of the present invention comprises a lamination operation (S10) of manufacturing a radical unit sheet 10, and a cutting operation (S20) of cutting a separation sheet 11 of the radical unit sheet 10 to manufacture a radical unit 20 comprising a separator and electrodes.

Figure 6:
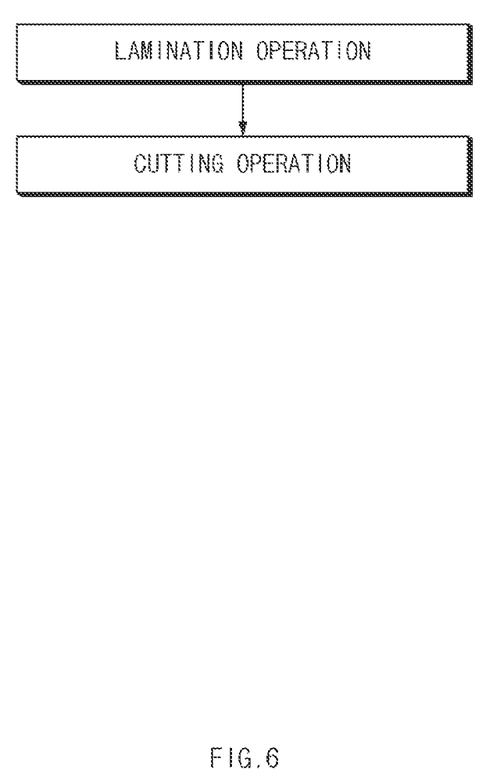
FIG. 6 is a flowchart illustrating a lamination method for a secondary battery according to the first embodiment of the present invention.

The lamination operation (S10) comprises a supply process of supplying at least one separation sheet and electrodes to be disposed in an overall length direction of the at least one separation sheet 11, and a bonding process of bonding the separation sheet 11 and the electrodes after the supply process, to manufacture the radical unit sheet 10.

The cutting operation (S20) comprises a transfer process of transferring, by a transfer conveyor 210, the radical unit sheet 10 after the lamination operation, a laser cutting process of irradiating, by a laser cutting unit 220, a laser beam onto the separation sheet 11 of the radical unit sheet 10 so that the separation sheet 11 is cut by irradiation from one end to the other end in a width direction of the separation sheet 11 to manufacture the radical unit 20, and a discharge process of transferring, by a discharge conveyor 230, the radical unit 20 cut by the laser cutting unit 220.

That is, referring to FIGS. 3 and 4, in the laser cutting unit 220, when a laser beam is generated by a laser generator 221, a focus is adjusted while the laser beam generated from the laser generator 221 passes through a lens 222, and the laser beam is irradiated onto the separation sheet 11 of the radical unit sheet 10 while reflected by a first reflector and a second reflector 223. When a tilt angle of the second reflector 223 is adjusted in the width direction of the separation sheet 11, the laser beam reflected by the second reflector 223 cuts the separation sheet 11 while moving from one end to the other end in the width direction of the separation sheet 11.

The cutting operation further comprises an adjusting process of adjusting a speed for cutting the separation sheet 11 through the laser cutting unit 220 depending on a spaced distance between the transfer conveyor 210 and the discharge conveyor 230. Here, an adjusting unit 240 is used.

That is, in the adjusting process, when the spaced distance between the transfer conveyor 210 and the discharge conveyor 230 increases, a moving speed of the laser cutting unit 220 is adjusted by the adjusting unit 240 to decrease, and when the spaced distance between the transfer conveyor 210 and the discharge conveyor 230 decreases, the moving speed of the laser cutting unit 220 is adjusted by the adjusting unit 240 to increase.

In addition, in the adjusting process, the speed for cutting the separation sheet 11 through the laser cutting unit 220 may be further adjusted depending on a moving speed of the transfer conveyor 210. That is, in the adjusting process, when the moving speed of the transfer conveyor 210 increases, the speed for cutting the separation sheet through the laser cutting unit 220 may be adjusted by the adjusting unit 240 to increase together, and when the speed of the transfer conveyor 210 decreases, the speed for cutting the separation sheet through the laser cutting unit 220 may be adjusted by the adjusting unit 240 to decrease together.

Furthermore, in the adjusting process, the speed for cutting the separation sheet through the laser cutting unit 220 may be further adjusted depending on a process speed of the lamination operation to manufacture the radical unit sheet 10. That is, in the adjusting process, when the process speed of the lamination operation increases, the speed for cutting the separation sheet through the laser cutting unit 220 may be adjusted by the adjusting unit 240 to increase together, and when the process speed of the lamination operation decreases, the speed for cutting the separation sheet through the laser cutting unit 220 may be adjusted by the adjusting unit 240 to decrease together.

In the adjusting process, the discharge conveyor may be adjusted to move at a faster speed than the transfer conveyor.

The lamination method may further comprise, after the cutting operation, a suction operation of suctioning and removing, by the suction unit 250, a foreign matter or dust occurring when the separation sheet is cut. The suction unit 250 comprises a lower suction 251 and an upper suction 252.

The suction operation comprises a first suction work of suctioning and removing, by the lower suction 251, a foreign matter and/or dust occurring below the separation sheet 11 when the laser cutting unit 220 cuts the separation sheet, and a second suction work of suctioning and removing, by the upper suction 252, a foreign matter or dust present on a top surface of the radical unit 20 transferred through the discharge conveyor 230.

When the operations as described above are completed, the radical unit 20, a finished product, may be manufactured.

Hereinafter, another embodiment of the present invention will be described using the same reference symbol for an element having the same function as the embodiment described above, and duplicate description is omitted.

[Cutting Device According to Second Embodiment of Present Invention]

The cutting device of the lamination apparatus for a secondary battery according to the first embodiment of the present invention described above may be separately made into a product.

Figure 7:
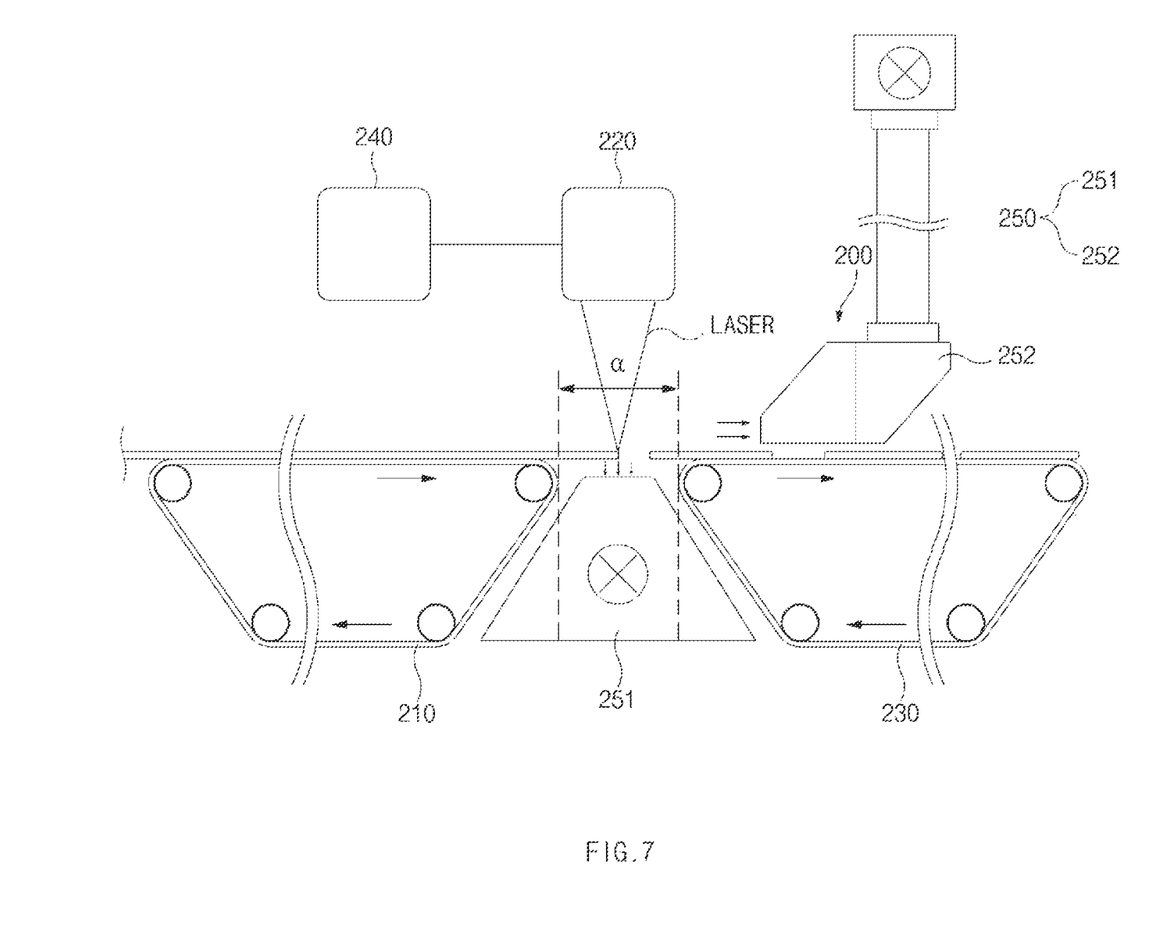
FIG. 7 is a side view illustrating a cutting device according to a second embodiment of the present invention.

As illustrated in FIG. 7, a cutting device 200 according to the second embodiment of the present invention may comprise a transfer conveyor 210, which transfers a radical unit sheet 10, a laser cutting unit 220, which cuts a separation sheet 11 of the radical unit sheet 10 passing through the transfer conveyor 210, to manufacture a radical unit 20, a discharge conveyor 230, which is provided apart from the transfer conveyor 210 and transfers the radical unit cut by the laser cutting unit 220, and an adjusting unit 240 which adjusts a speed of cutting the separation sheet through the laser cutting unit depending on a spaced distance between the transfer conveyor 210 and the discharge conveyor 230.

The scope of the present invention is defined by the appended claims rather than the foregoing detailed description. Various modifications made within the meaning of an equivalent of the claims of the invention and within the claims are to be regarded to be in the scope of the present invention.

DESCRIPTION OF THE SYMBOLS

10: Radical unit sheet
11: Separation sheet
12: First electrode
13: Second electrode
20: Radical unit
100: Lamination device
110: Supply unit
111: Separation sheet supply roller
112: First electrode supply roller
113: Second electrode supply roller
114: First cutter
115: Second cutter 120: Bonding unit
121: Laminator
122: Pressing roller 200: Cutting device
210: Transfer conveyor
220: Laser cutting unit
221: Laser generator
222: Lens
223: Second reflector
224: F-theta lens
230: Discharge conveyor
240: Adjusting unit
250: Suction unit
251: Lower suction
252: Upper suction

The invention claimed is:

1. A lamination apparatus for a secondary battery, the lamination apparatus comprising:
a lamination device having a supply unit and a bonding unit, the supply unit being configured to supply electrodes disposed spaced apart by a set gap and disposed on at least one separation sheet, and the bonding unit being configured to bond the at least one separation sheet and the corresponding electrodes passing through the supply unit to manufacture a radical unit sheet; and
a cutting device configured to cut the separation sheet of the radical unit sheet, passing through the lamination device, to manufacture a radical unit constituted by a separator formed from the separation sheet and the electrodes,
wherein the cutting device comprises:
a transfer conveyor configured to transfer the radical unit sheet passing through the lamination device;
a laser cutting unit configured to irradiate a laser onto the separation sheet of the radical unit sheet while the separation sheet is passing through the transfer conveyor, wherein the separation sheet is cut by irradiation of the laser from one end of the separation sheet to another end of the separation sheet in a width direction of the separation sheet to manufacture the radical unit;
a discharge conveyor separated from the transfer conveyor and configured to transfer the radical unit formed by the laser cutting unit; and
an adjusting unit configured to adjust a speed of the laser irradiation across the separation sheet during cutting of the separation sheet passing through the laser cutting unit,
wherein the cutting device further comprises a suction unit configured to suction and remove a foreign matter or dust occurring when the laser cutting unit cuts the separation sheet, and
wherein the suction unit comprises:
a lower suction portion located between the transfer conveyor and the discharge conveyor and configured to suction and remove a foreign matter or dust occurring below the separation sheet when the separation sheet is cut; and
an upper suction located above the discharge conveyor and configured to suction and remove a foreign matter or dust present on a surface of the radical unit while the radical unit is being transferred by the discharge conveyor.

2. The lamination apparatus of claim 1, wherein the adjusting unit further adjusts the speed for cutting the separation sheet passing through the laser cutting unit depending on a moving speed of the transfer conveyor, wherein when the moving speed of the transfer conveyor increases, the adjusting unit adjusts the speed for cutting the separation sheet passing through the laser cutting unit to increase correspondingly, and
wherein when the moving speed of the transfer conveyor decreases, the adjusting unit adjusts the speed for cutting the separation sheet passing through the laser cutting unit to decrease correspondingly.

3. The lamination apparatus of claim 2, wherein the adjusting unit further adjusts the speed for cutting the separation sheet passing through the laser cutting unit depending on a processing speed of the lamination device to manufacture the radical unit sheet,
wherein when the processing speed of the lamination device increases, the adjusting unit adjusts the speed for cutting the separation sheet passing through the laser cutting unit to increase correspondingly, and
wherein when the process speed of the lamination device decreases, the adjusting unit adjusts the speed for cutting the separation sheet passing through the laser cutting unit to decrease correspondingly.

4. The lamination apparatus of claim 1, wherein the discharge conveyor has a set speed faster than that of the transfer conveyor.

* * * * *